US008145691B2

(12) United States Patent
Sudhakar (10) Patent No.: US 8,145,691 B2
(45) Date of Patent: Mar. 27, 2012

(54) TECHNIQUES FOR RANDOM BIT GENERATION

(75) Inventor: Gosukonda Naga Venkata Satya Sudhakar, Bangalore, IN (US)

(73) Assignee: Novell, Inc., Provo, UT (US)

( * ) Notice: Subject to any disclaimer, the term of this patent is extended or adjusted under 35 U.S.C. 154(b) by 1421 days.

(21) Appl. No.: 11/508,719

(22) Filed: Aug. 23, 2006

(65) Prior Publication Data

US 2007/0233762 A1 Oct. 4, 2007

(30) Foreign Application Priority Data

Feb. 24, 2006 (IN) .............................. 506/DEL/2006

(51) Int. Cl.
*G06F 1/02* (2006.01)
(52) U.S. Cl. ...................................................... 708/250
(58) Field of Classification Search ........................ None
See application file for complete search history.

(56) References Cited

U.S. PATENT DOCUMENTS

| | | | | |
|---|---|---|---|---|
| 4,649,419 | A * | 3/1987 | Arragon et al. ................ | 380/215 |
| 4,890,252 | A * | 12/1989 | Wang ............................. | 708/250 |
| 6,002,769 | A * | 12/1999 | McGough ....................... | 380/28 |
| 6,404,808 | B1 | 6/2002 | Onu | |
| 6,552,588 | B1 | 4/2003 | Cruz-Albrecht | |
| 6,865,660 | B2 | 3/2005 | Duncan | |
| 6,910,056 | B1 | 6/2005 | Mauer | |
| 6,931,129 | B1 | 8/2005 | Faber et al. | |
| 2004/0162864 | A1 | 8/2004 | Nowshadi et al. | |
| 2005/0044119 | A1 | 2/2005 | Langin-Hooper et al. | |
| 2005/0053233 | A1 | 3/2005 | Vaudenay et al. | |

OTHER PUBLICATIONS

Author: Peterson; Title: "A Catalog of Random Bits"; Date: Apr. 22, 1996; URL: http://www.maa.org/mathland/mathland_4_22.html.*
Author: Kak; Title: "On Decimal Sequences"; Date: Sep. 1981; URL: http://ieeexplore.ieee.org/search/wrapper.jsp?arnumber=1676636.*
Author: Chi et al.; Title: "On the optimal Halton sequence"; Date: May 23, 2005; URL: http://dx.doi.org/10.1016/j.matcom.2005.03.004.*
Author: Hopwood; Title: "Standard Cryptographic Algorithm Naming"; Date: Oct. 22, 2002; Section: RC4-drop[(nbytes)]; URL-Copyright: http://web.archive.org/web/20021220200935/http://www.users.zetnet.co.uk/hopwood/crypto/scan/intro.html; URL: http://web.archive.org/web/20021218123840/http://www.users.zetnet.co.uk/hopwood/crypto/scan/cs.html#RC4-drop.*
Author: Mascagni; Title: "Some Methods of Parallel Pseudorandom Number Generation"; Date: 1997; URL: http://citeseerx.ist.psu.edu/viewdoc/summary?doi=10.1.1.50.7301.*
Author: Engelbrecht; Title: "The Magical Mod Function"; Date: Jun. 24, 2004; URL: http://web.archive.org/web/20040624214811/http://www.asp101.com/articles/steven/mod/default.asp.*
Author: Pickover; Title: "Random number generators: Pretty good ones are easy to find"; Date: Jul. 1995; URL: http://www.springerlink.com/content/h08813260042656u/.*

(Continued)

*Primary Examiner* — Tan Mai (74) *Attorney, Agent, or Firm* — Schwegman, Lundberg & Woessner, P.A.

(57) ABSTRACT

Techniques are presented for randomly generating bits. A seed is inverted and a non repeating portion of the resulting digits from the inversion are retained. The inverted seed is then raised to a power to acquire another non repeating portion or additional digits. This process is repeated for a desired number of iterations. The resulting digits are then selectively combined to generate a stream of randomly generated bits with an infinite period.

19 Claims, 3 Drawing Sheets

OTHER PUBLICATIONS

Author: Carr; Title: "Simple random number generation"; Date: Oct. 29, 2003; URL: http://dx.doi.org/10.1016/j.cageo.2003.07.002.*

Author: Wheeler; Title: "mother.c"; Date: Aug. 8, 1994; URL: http://www.stat.berkeley.edu/classes/s243/mother.c.*

Author: Pangratz et al.; Title: "Pseudo-Random Number Generator Based on Binary and Quinary Maximal-Length Sequences"; Date: Sep. 1979; URL: http://ieeexplore.ieee.org/search/wrapper.jsp?arnumber=1675431.*

Author: Peyravian et al.; Title: "Alternative Method for Unique RSA Primes Generation"; Date: Apr. 2001; URL: http://dx.doi.org/10.1016/S0167-4048(01)00210-3.*

Author: Herlekar et al.; Title: "Performance analysis of a D-sequence based Direct Sequence CDMA system"; Date: 2002; URL: http://www.ece.lsu.edu/kak/p050202.pdf.*

Author: Kak; Title: "Generating d-Sequences"; Date: Feb. 26, 1987; URL: http://ieeexplore.ieee.org/stamp/stamp.jsp?tp=&arnumber=4257468&isnumber=4257413.*

Author: Kak; Title "New result on d-sequences"; Date: Jun. 4, 1987; URL: http://ieeexplore.ieee.org/search/srchabstract.jsp?arnumber=4257775&isnumber=4257768&punumber=2220&k2dockey=4257775@ieejrns&query=%28kak+%3Cin%3E+au%29+%3Cand%3E+%282220+%3Cin%3E+punumber%29&pos=5&access=no&tag=1.*

Author: Kak; Title: "A New Random Number Generator"; Date: Feb. 5, 2006; URL: http://www.ece.lsu.edu/kak/RNG.pdf.*

Carter, Stephen R., et al., "Random Number Generation", *U.S. Appl. No. 10/999,595, filed Nov. 30, 2004*, 29 pgs.

* cited by examiner

TECHNIQUES FOR RANDOM BIT GENERATION

RELATED APPLICATION

The present application claims priority to India Patent Application No. 506/DEL/2006 filed in the India Patent Office on Feb. 24, 2006 and entitled "Techniques for Random Bit Generation," the disclosure of which is incorporated by reference herein.

FIELD

The invention relates generally to data processing and more particularly to techniques for generating random bits for use in random number applications.

BACKGROUND

A variety of applications continue to rely on the effectiveness of random number generation. A random number generator provides a mechanism for producing a series of numbers that, in theory, are unpredictable and not repeatable. In practice techniques generally yield random numbers that are difficult or impractical to be reproduced or repeated. The uniqueness or substantial perceived uniqueness of a random number makes it attractive to certain types of applications. For example, random numbers are often used in scientific computations, such as statistical sampling for a population; used in encryption with cryptography; used in gaming applications to determine random wins and losses; and used in other applications.

Typically, random numbers in software are produced by providing a seed value to a random number generator. If a seed value is discovered then the randomness of the generator may be compromised. Additionally, if a pattern is detected from a variety of discovered random numbers, then potentially the pattern can be used to reverse engineer and discover the algorithm and seed values being used by the random generator. Thus, if an intruder can reproduce a seed value by looking at patterns of random numbers or by using discoverable values to produce the seed value, then the intruder may be able to replicate the random number or produce a desired random number. Once a random number is successfully reproduced, then the intruder may break keys and other areas of security.

So, intruders typically look for patterns in the input and/or output for random number generators. The patterns assist in discovering the random number algorithm and thereby comprising applications, which rely on unique and presumably non-reproducible random numbers.

If random numbers are not truly unique than different iterations may yield a same or duplicate random number that was previously produced. Within the parlance of random computing, a "period" refers to iterations before a repeated pattern or repeated number is produced. An infinite period is a desired goal of random computing, but has thus far remained an elusive concept within the industry. That is, most random generation techniques have some period that is less than infinity; meaning a repeated pattern eventually emerges within a random generation technique after some elapsed time or after some number of iterations associated with any given technique.

Therefore, an improved random generation technique is desirable, such that a period associated with that technique approaches or achieves a state of non-repeatability or infinity.

SUMMARY

In various embodiments, techniques are provided for generating a random stream of bits. More particularly and in an embodiment, a reciprocal is taken for a prime number for purposes of acquiring a first set of non-repeating digits. Next, the prime number is iteratively raised, within the reciprocal, to different powers and one or more second sets of non-repeating digits are acquired. The one or more second sets of non-repeating digits represent the prime number raised to each of the powers within the reciprocal. Furthermore, the first and second sets of non-repeating digits are selectively processed to generate a random stream of bits.

DETAILED DESCRIPTION

As used herein, the techniques presented may be referred to as "cryptographically secure pseudo random number generation (CSPRNG)". As will be more completely demonstrated herein and below, the CSPRNG techniques produce a continuous and infinite stream of random bits. The bits may be aggregated in desired subsets to form random numbers for applications in desired sizes or lengths.

An example use in cryptography for CSPRNG techniques includes a nonce. A nonce is a random number that is used in a particular communication, such that the number is not repeatable and not reusable to replay attacks or replay communications. The presence of the nonce is needed for a successful communication to occur.

Another example use is a salt. A salt consists of random bits used as one of the inputs to a key derivation function. The other input may be a password or a pass phrase. The output of the key derivation function is often stored as the encrypted version of the password. It can also be used as a key for use in a cipher or other cryptographic algorithm. A salt value is typically used in a hash function.

In still another example, the CSPRNG techniques may be used for cryptographic key generation for purposes of deriving algorithms to encrypt and decrypt data or communications.

However, it is also to be understood that the techniques presented herein may also be used by gaming, scientific, and other applications, which rely on or which may benefit from random numbers.

A "reciprocal" refers to an inversion of a given number. So, the inversion of the number two (2) may also be referred to as a reciprocal of 2 and it is expressed as ½ or 0.5. The reciprocal of the number three (3) is 0.3333, such that the digit three repeats for infinity. The terms "reciprocal" and "inversion" may be used interchangeably herein and refer to a number being placed in the denominator of a fraction where the numerator is set to 1.

The result of an inversion produces a series of digits (0-9), some of which may repeat if an inversion is not completely solvable. In the example above, the inversion of 3 has a single digit 3 that is repeated over and over again for infinity. The inversion of the number five (5) has a single resulting digit of 2 (solved as 1/5=0.2). The point at which digits begin to repeat within an inversion is referred to that numbers period. So, the period for 5 is 1, the period for 3 is 1, the period for 2 is 1.

A golden prime number (GPN) is a prime number (P) that has a period of P−1. So, 5 is a P, but 5 is not a GPN, since the period of 5 (P) is 1 and 5−1 (P(5)−1) is equal to 4 and not 1 (a GPN has a period of P−1, so if 5 were a GPN its period would have been 4). The number seven (7) is a GPN because its reciprocal is equal to 0.142857142857, here 7 is a P and it has a period of 6; that is, a sequence of 6 unique digits are produced (142857) in the reciprocal result for 7 before the sequence or set of digits repeat. So, P=7 and 7−1=6; and a GPN has a period equal to P−1. 7's has a period of 6 and is thus a GPN.

According to an embodiment, the CSPRNG techniques may be implemented within Novell Transport Layer Security (NTLS) products distributed by Novell, Inc. of Provo, Utah. In another embodiment, the CSPRNG techniques may be implemented within Storage Management Services (SMS) distributed by Novell, Inc. of Provo, Utah. It is however to be understood that the CSPRNG techniques presented herein may be integrated within existing products, operating systems, services, and/or architectures as enhancements to existing random number generation services or as standalone and new random number generation services.

Figure 1:
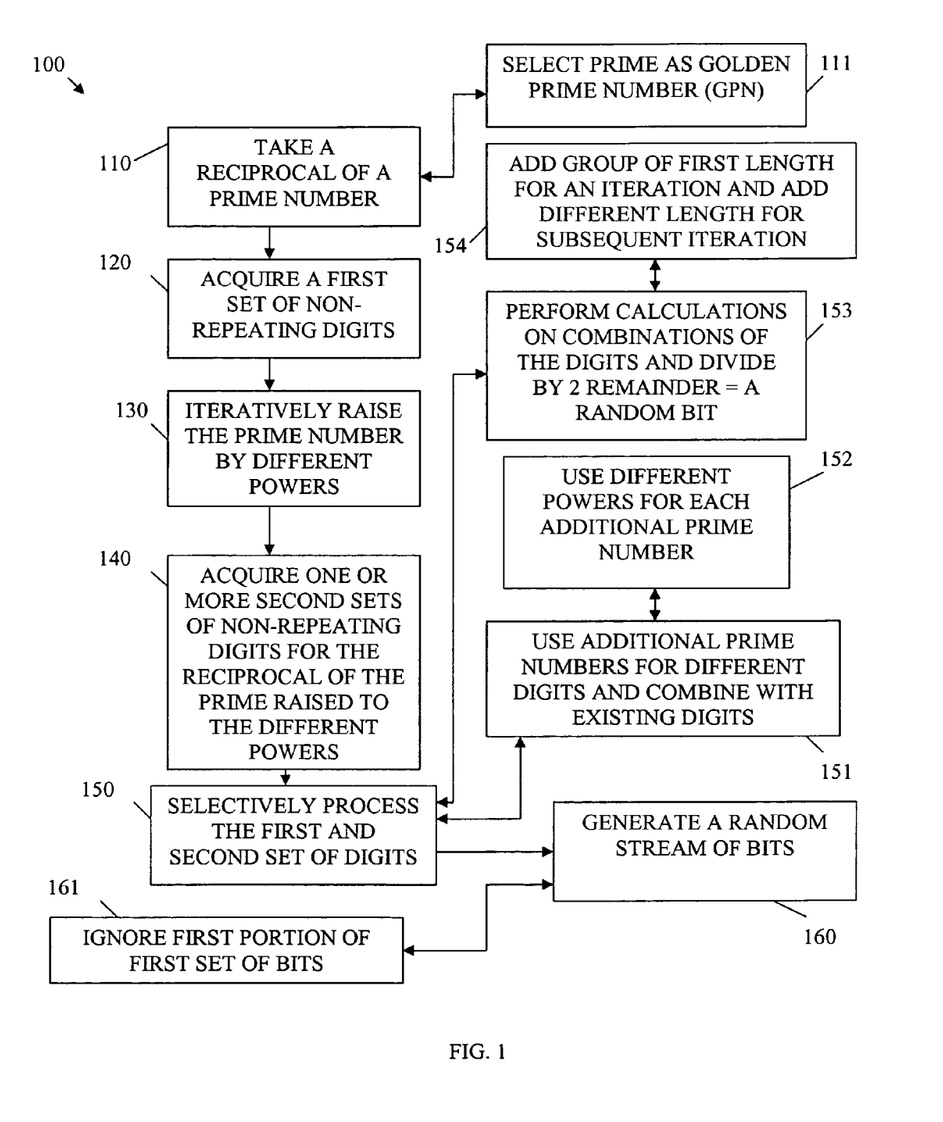
FIG. 1 is a diagram of a method for generating a random stream of bits, according to an example embodiment.

FIG. 1 is a diagram of a method 100 for generating a random stream of bits, according to an example embodiment. The method 100 (hereinafter "random bit generation service") is implemented in a machine-access and machine-readable medium and is accessible over a network. The network may be wired, wireless, or a combination of wired and wireless.

Initially, the random bit generation service is implemented as a modified version of a random number generator or as a stand alone, new, and independent random generation service. The random bit generation service produces a stream of bits that do not exhibit a repeatable pattern. In other words, the stream of bits has an infinite period. As detailed above, a variety of existing applications may then consume the random bits as random numbers parsed or acquired from the generated random stream in desired number lengths or sizes (e.g., 32 bit, 64 bit, 128 bit, 256 bit, etc.)

At 110, a reciprocal of a prime number is taken or generated. According to an embodiment, at 111, the prime number may be initially acquired as a GPN (a prime number (P) having a reciprocal period of P−1). The prime number may be randomly generated.

In some cases, certain predefined prime numbers may be avoided altogether. For example, the prime numbers 2, 3, 5, and 11 may be avoided, since these prime numbers exhibit small periods. Yet, any prime number may be used with the teachings presented herein since even prime numbers with small periods may have larger periods and more effectively especially when combined with the techniques expressed in more detail herein and below. So, although some embodiments may advantageously avoid certain prime numbers; other embodiments may utilize any prime number when combined with additional techniques discussed herein and below.

At 120, the random bit generation service acquires a first set of non-repeating digits from the reciprocal of the prime number. As an example, if the prime number 7 is selected, then the first set of non-repeating digits for the reciprocal of 7 is "142857."

At 130, the random bit generation service iteratively raises the prime number to one or more powers within the reciprocal to acquire, at 140, one or more second sets of non-repeating digits. So, in the example with the prime number being selected as 7 if we raise 7 to the power of 2 it is 49 and if 49 is inverted we acquire a second set of non-repeating digits of "020408163" (this was redacted for simplicity since the non-repeating digits of the reciprocal of 49 is much larger). The processing at 130 may be repeated for any desired number of iterations and assumes that the power is not 0 or 1, since any number raised to the $0^{th}$ power is 1 and its reciprocal would be 1 and any number raised to the $1^{st}$ power is the number itself, which was processed as a reciprocal at 120 to acquire the first set of digits. Again, one or more additional sets of second non-repeating digits may be acquired at 130 by increasing the prime number to a power greater than 1 and acquire the reciprocal for non-repeating digit strings.

At 150, the random bit generation service selectively processes the first and second set(s) of non-repeating digits. This means that the digits are combined in various manners and processed to produce a random stream of bits, which is the output of the random bit generation service.

In an embodiment, at 151, the random bit generation service may process a number of times with additional and different prime numbers. This produces a first and a second set of digits for each different prime number used. These different sets of digits may be combined in novel manners with the original first and second set of digits to generate the random string of bits.

As an example, consider that the random bit generation service process another iteration with the number 5. The reciprocal of 5 produces a single digit for its first set of digits as 2. Next, 5 is raised to the $2^{nd}$ power or 25 and inverted to acquire a second set of non-repeating digits of "04". In the above example, 7 included a first set of digits as "142857" and a reduced second set of "020408163." The two different sets of first and second digits may be combined in novel manners to assist in ultimately producing the generated random stream of bits.

According to an embodiment, at 152, each additional prime number may use a different power from what was used for the original prime number and/or from what was used with other different prime numbers. This further increases the likelihood that the technique being used to produce random bits having an infinite period will not be detected. So, in the above example the second prime number used, 5, could have been raised to the $3^{rd}$ power or 125, such that its second set of non-repeating digits for the reciprocal of 125 is "008."

It should be emphasized, that the technique to generate the first and second set of non-repeating digits can be used to produce an infinite period of non repeating digit patterns. Once this is achieved, then, as is discussed in detail below, a variety of additional techniques may be used to combine the random numbers to produce random streams of bits.

One technique for processing the first and second set of non-repeating digits is depicted at 153. Here, the random bit generation service performs calculations on various combinations of the digits and then divides the results by two; the remainder (which is either a 0 or a 1) is used as one of the bits in the random stream of bits.

For example, in the example used with the prime number 7, the first two digits from a concatenated string representing the first and second digits ("142857020408163") may be added together to produce the number 5 (1+4). 5 is then divided or used in a modulus operation by 2 (MOD 2) to produce "1." The 1 becomes the first bit value in the random stream of bits produced, at 160.

A variety of permutations may be used to acquire and mix the first and second set of digits or to mix the first and second sets of digits for the original prime number and its powers with other first and second sets of digits for other prime numbers. For instance, a first so many digits may be ignored as depicted at 161. The number of digits to ignore may also be a calculated integer value that is not a hard coded constant, such as selecting the number of digits as a number that is less than the possible period for the power of the prime which is greater than some other number (e.g., $P^K/2$; where P is the prime and K is the power). Also, the number of ignored digits may itself be randomly generated.

In still other cases, random digit locations may be combined; the first two digits in one set may be added with the first three digits of another set, etc. So, the $1^{st}$, $5^{th}$, and $8^{th}$ positions in the digit string may be added together initially and the $2^{nd}$, $3^{rd}$, and $9^{th}$ positions added together in another processing iteration, and so on. This may be random and does not have to be deterministic.

It is also noted that a modulus two does not always have to be implemented to acquire a single bit for the random stream of bits. In other words, a modulus N may be used, where N is an integer less than the probable final sum of the digits calculated. In a similar manner addition does not always have to be used to combine the digits; thus, subtraction, multiplication, etc. may be used.

As another embodiment, at 154, consider that a first set of serial digits or random digits from the digit string may be added together for one iteration to acquire a first bit of the random string of bits and in a subsequent iteration a different set of digits or random digits having a different length may be added together to acquire a second or next bit for the random string or bits.

At 160, as the first and second sets of bits are processed in novel manners and combinations, as described by the examples presented above, the bits of the random stream of bits are generated and outputted by the random bit generation service. The size of this stream of bits is potentially infinite and can continue for as long as the random bit generation service processes the prime number and its desired powers or processes combinations of prime numbers. So, by processing the random bit generation service an endless stream of random bits are produced. These bits may then be parsed in desired subsets or manners to acquire random numbers of desired lengths.

Figure 2:
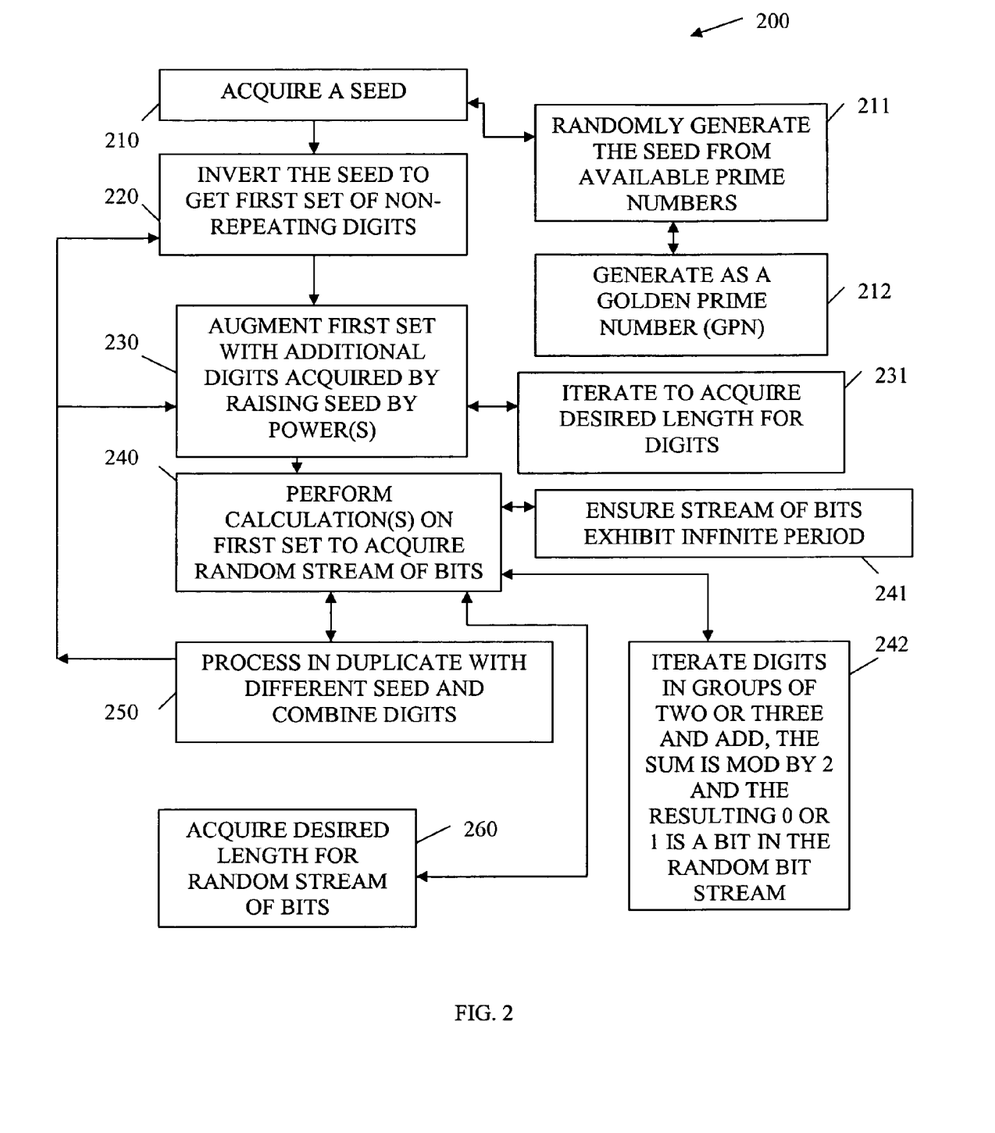
FIG. 2 is a diagram of another method for generating a random stream of bits, according to an example embodiment.

FIG. 2 is a diagram of another method 200 for generating a random stream of bits, according to an example embodiment. The method 200 (hereinafter "random generation service") is implemented in a machine-accessible and readable medium and is accessible over a network. The network may be wired, wireless, or a combination of wired and wireless. The random generation service provides an alternative view or processing perspective of the random bit generation service represented by the method 100 of the FIG. 1.

At 210, the random generation service initially acquires or is fed a seed value. According to an embodiment, at 211, the seed value is selected from a pool of available prime numbers. In still another situation, at 212, the pool of available prime numbers may be GPN's. Also, it may be desirable to exclude a certain class of prime numbers, such as 2, 3, 5, and 11 which are non GPN's; although as discussed above this does not have to be the case given the enhanced processing using powers of primes.

The seed value may be manually fed to the random generation service or may be randomly generated itself by using a different algorithm by the random generation service. It is also noted, that multiple seed values may be used, such as when multiple different prime numbers produce non-repeating digits and the digits are combined to generate the random stream of bits.

At 220, the random generation service inverts the seed value to get a first set of non-repeating digits. That is, if a pattern associated with substrings within the result associated with the inversion of the seed emerges, only the unique pattern is retained and it is classified as the first set of non-repeating digits. To detect this repeated pattern, one can save the first 'n' digits. The 'n' here can be (as an example) 4 times that of the number of digits in the number. One can write this as $(4*(\log(q)+1))$. Here, q is the number whose reciprocal is taken and $(\log(q)+1)$ gives the number of digits in q. One can compare these "n" digits with the output being generated out of the reciprocal and thus detect the repetition. One need not compare till q/2 number of digits are generated as the repetition will start only after this.

At 230, the random generation service augments the first set of digits with additional digits acquired by raising a power of the seed within a reciprocal. The actual selection of the power may be random; assuming the power is greater than 1. Moreover, at 231, the processing, at 230, that raises powers of the seed may be iterated to achieve any desired length of number of additional digits that are used to augment the first set of digits. So, if a single power combined with the first set of digits only yields a handful of digits, the processing may be repeated or iterated with other powers to produce more digits.

At 240, the random generation service performs calculations on the first set of bits that have been augmented by the processing at 230 with additional bits for purposes of acquiring a random stream of bits. The resulting stream of bits, at 241, may be inspected or analyzed to determine that substrings of serial bits within the stream of bits do not repeat in patterns with the stream of bits. This ensures that the resulting stream of bits has an infinite period.

According to an embodiment, at 242, the random generation service may iterate digits in groups of two or three or any other subset of groupings and then add each group together and perform a modulus 2 operation on the each sum for each group. The resulting remainder or value from the modulus operation is either a 0 or a 1 and is used as one of the bits included within the random stream of bits.

As was discussed in detail above, with respect to the method 100 of the FIG. 1, a variety of custom processing techniques may be implemented to combine the digits in different and sometime random manners to produce the bits, which are generated in the random stream of bits. In fact, any processing permutation may be used with embodiments presented herein as long as the manner in which the initial digits are produced uses reciprocal values of seeds combined with reciprocal values for various powers of the seeds, as described herein.

In an embodiment, at 250, the random generation service may be process a number of the operations in duplicate and/or in parallel using different seeds to produce a different set of digits. So, the processing at 220 and 230 may be repeated or iterated for a different seed to produce different digits from the original processing with the original seed. Such a scenario was discussed in detail above with the method 100 of the FIG. 1, where multiple different prime numbers were used to produce different sets of digits. This technique provides increased security by further ensuring that it is highly unlikely an improbable that an intruder could figure out the algorithm being used to generate the random string of bits.

According to an embodiment, at 260, the random generation service may acquire or generate a desired length for the random stream of bits in response to a processing or configuration parameter. In some cases, the random generation service may just continue to process producing a random string of bits with a continually growing length until the random generation service is terminated or stopped. In other situations, a desired length may be communicated to the random generation service via a dynamic parameter or instruction or via an environmental parameter or configuration or even profile. The length may also be driven by a target application that consumes the random stream of bits to generate a random number, a nonce, a salt, and the like.

Figure 3:
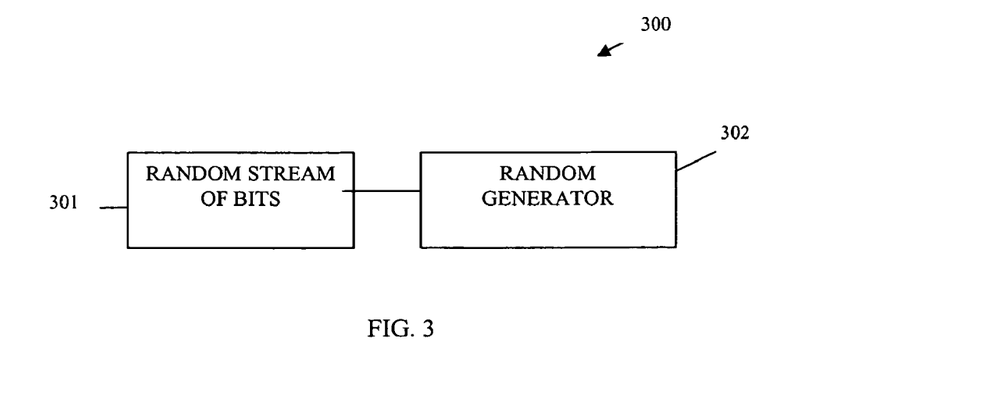
FIG. 3 is a diagram of a random bit stream generation system, according to an example embodiment.

FIG. 3 is a diagram of a random bit stream generation system 300, according to an example embodiment. The random bit stream generation system 300 is implemented in a machine-accessible and readable medium and is accessible over a network. The network may be wired, wireless, or a combination of wired and wireless. In an embodiment, the random bit stream generation system 300 implements, among other things, various aspects of the methods 100 and 200 of the FIGS. 1 and 2, respectively.

The random bit stream generation system 300 includes a random stream of bits 301 and a random generator 302. Each of these will now be discussed in turn.

The random stream of bits 301 are produced by the random generator 302. The random stream of bits 301 do not exhibit any repeating patterns for substrings contained within the random stream of bits 301. In essence, the random stream of bits 301 exhibits an infinite period in random computing parlance. From this random stream of bits 301, other applications may parse and acquire random numbers of configurable and desirable lengths (e.g., 32 bit, 64 bit, 128 bit, 256 bit, etc.). In fact, in some cases the length of the random stream of bits 301 may be driven by either the consuming application or its needs for random numbers or by a processing or configuration parameter passed to the random generator 302.

The random generator 302 performs processing described above with respect to the methods 100 and 200 of the FIGS. 1 and 2. So, the random generator 302 uses an initial seed value or prime number to acquire a first set of non-repeating digits. Subsequent to that, the random generator 302 raises the seed or prime to a power and repeats processing of that particular reciprocal for another set of non-repeating digits.

A number of different variations may occur as well with the processing of the random generator 302. For example, the digits being collected for purposes of generating a random stream of bits may be collected from a single seed or prime raised to a single additional power, may be collected from a single seed or prime raised to multiple additional powers, may be collected from multiple seeds or primes each raised to a single additional power, or may be collected from multiple seeds or primes each raised to multiple additional powers. These situations were discussed in detail above with respect to the discussions of the methods 100 and 200 in the contexts of the discussions with the FIGS. 1 and 2.

In some cases, the seed initially chosen or provided to the random generator 302 is a GPN. In other cases, it is any prime number except for a subset of undesired prime numbers. In yet other cases, it is any prime number irrespective of whether the selected prime is a GPN or is desirable or not.

The seeds or prime numbers may be randomly selected by the random generator 302 or may be acquired as a processing parameter to the random generator 302.

Once a desired number of non-repeating digit strings are acquired, the random generator 302 performs any number of techniques to combine and compute the digits for purposes of iteratively generating the random stream of bits 301. Various examples of some of these calculations and manipulations were presented above with respect to the discussions associated with the methods 100 and 200 of the FIGS. 1 and 2.

Figure 4:
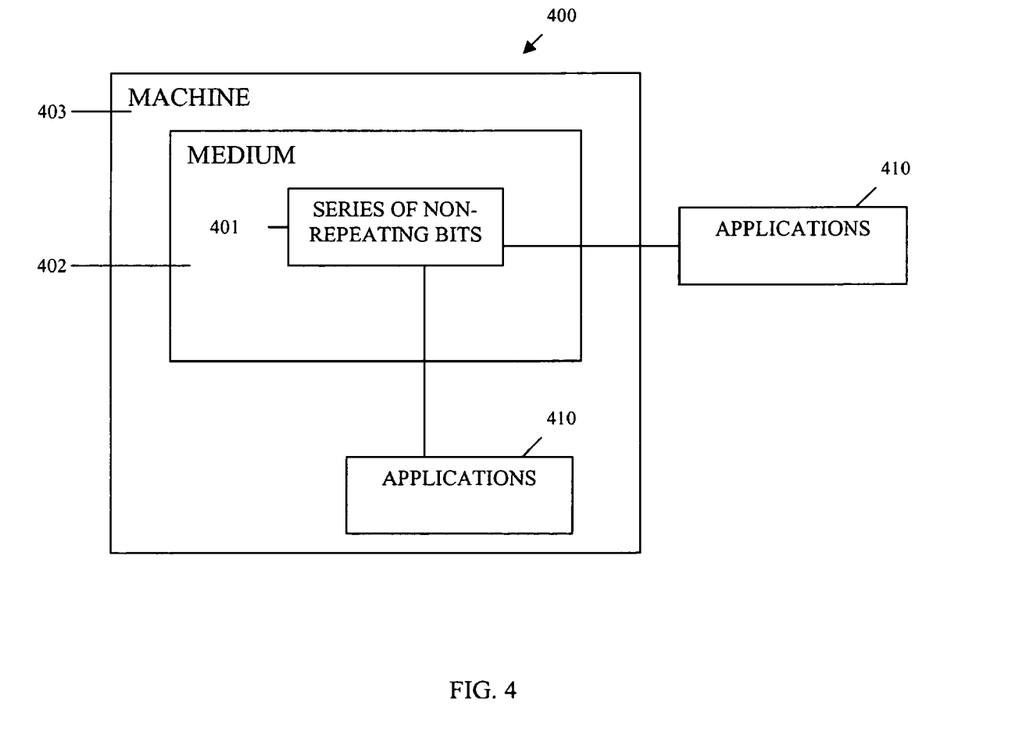
FIG. 4 is a diagram of random stream of bits implemented within a machine-accessible medium and consumed by applications within a machine to generate random numbers, according to an example embodiment.

FIG. 4 is a diagram 400 of random stream of bits implemented within a machine-accessible medium and consumed by applications within a machine to generate random numbers, according to an example embodiment. The random stream of bits is implemented in a machine-accessible and readable medium is accessible over a network. The network may be wired, wireless, or a combination of wired and wireless. In an embodiment, the random stream of bits represents the output produced by the methods 100 and 200 of the FIGS. 1 and 2 and the output produced by the random generator 302 of the FIG. 3 as the random stream of bits 301.

The random stream of bits includes a series of bits 401 residing in a machine-accessible medium 402. The bits 401 are consumed by applications 410 within a machine 403 to generate random numbers.

The bits 401 are generated as a result of selectively combining and processing digits. The digits are acquired by inverting a seed or prime number and retaining non-repeating strings associated with the inversion and then performing the same operation on the seed or prime raised to one or more additional powers. In some embodiments, multiple seeds or prime numbers may be used to initially acquire the digits. The digits are then combined and processed in selective groupings to produce a single bit associated with the series of bits 401.

The series of bits 401 include no-repeating patterns and may thus be viewed as having an infinite period. Moreover, the actual length of the series of bits 401 is configurable, such that the length is driven by a consuming application 410 and its needs for random numbers, a nonce, and/or a salt; or driven by a processing configuration or user profile.

The applications 410 may reside within the same machine 403 as the series of bits 401 or may reside outside the machine 403 over a network and/or on a different machine or device. The applications 410 consume the series of bits 401 to acquire random numbers, a nonce, or a salt. The random numbers are non-repeatable and secure based on the technique used to produce the series of bits 401.

Examples of methods 100 and 200 and systems 300 that may be used to generate the series of bits 401 were described in detail above with respect to the FIGS. 1-3.

One now appreciates how an infinite period string of random bits may be generated using reciprocals and powers of reciprocals in a novel combination. Moreover, various other processing techniques increase the security and randomness, as described in detail above.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A non-transitory machine-implemented method for executing on a machine, comprising:
    taking, by the machine, a reciprocal of a prime number for acquiring a first set of non-repeating digits, the prime number is not taking as a particular prime number that is predefined as to be avoided based on having a predefined insufficient period;
    iteratively raising, by the machine, the prime number within the reciprocal to different powers;
    acquiring, by the machine, one or more second sets of non-repeating digits represented by the prime number raised to each of the powers within the reciprocal; and
    selectively processing, by the machine, the first and second sets of non-repeating digits to generate a pseudo-random stream of bits.

2. The method of claim 1 further comprising, ignoring, by the machine, a first portion of the first set of digits before processing the first and second sets of non-repeating digits to generate the pseudo-random stream of bits.

3. The method of claim 1 further comprising, using, by the machine, one or more additional prime numbers within different reciprocals to acquire one or more different sets of non-repeating digits and selectively combining with the first and second set of non-repeating digits during the processing to generate the pseudo-random set of bits.

4. The method of claim 3, wherein iteratively raising further includes using additional and different powers for each of the additional prime numbers when acquiring the one or more different sets of non-repeating digits.

5. The method of claim 1, wherein selectively processing further includes performing a calculation on selective combinations of the first and second digits to acquire results that are then divided by two and using remainders of the division as the pseudo-random stream of bits.

6. The method of claim 5 further comprising, acquiring, by the machine, selective combinations by adding a group of one length of the first and second digits for one iteration to acquire one bit of the pseudo-random stream of the bits and by adding a group of a different length for another iteration to acquire another bit of the pseudo-random stream of bits.

7. A non-transitory machine-implemented method for executing on a machine, comprising:
    acquiring, by the machine, multiple seed values;
    inverting, by the machine, each seed value to acquire a first set of digits that do not repeat by inspecting each inversion for a repeating pattern and retaining just the pattern before the pattern repeats as the first set of digits;
    augmenting, by the machine, the first set of digits with additional digits acquired by raising the inverted multiple seed values by one or more powers, wherein each set of additional digits do not repeat for that set; and
    performing, by the machine, one or more calculations on the first set of digits with the additional bits to acquire a pseudo-random stream of bits.

8. The method of claim 7, wherein acquiring the multiple seed values further includes pseudo-randomly generating the multiple seed values as numbers selected from available prime numbers.

9. The method of claim 8, wherein acquiring the multiple seed values further includes generating the numbers as golden prime numbers.

10. The method of claim 7, wherein augmenting further includes processing the augmenting for a desired number of iterations to acquire a desired length for the first set of digits.

11. The method of claim 7, wherein performing further includes iterating the first set of digits by adding a grouping of two or three digits from the first set of digits and using a modulus two operation on the result to acquire a zero or one and then using the zero or one as one bit within the pseudo-random stream of bits.

12. The method of claim 7 further comprising, processing, by the machine, the method in duplicate for a different seed and combining the performing operations on the two sets of first digits to generate the pseudo-random stream of bits.

13. The method of claim 7 further comprising, iterating the inverting, augmenting, and performing, by the machine, to acquire a desired length for the pseudo-random stream of bits.

14. The method of claim 7 further comprising, ensuring, by the machine, the pseudo-random stream of the bits exhibits a very long period.

15. A system, comprising:
    a pseudo-random stream of bits residing in a non-transitory machine-readable medium; and
    a random generator implemented and residing in a non-transitory machine-readable medium and to execute on a machine, the random generator is to produce the pseudo-random stream of the bits by inverting multiple seed values to acquire digits that do not repeat and by iteratively raising the multiple inverted seed values to different powers to augment the digits, each different power that is inverted retains non-repeating digits, and the resulting digits are selectively manipulated to produce the pseudo-random stream of bits, other applications parse then parse configurable lengths of bits from the pseudo-ransom stream of bits to acquire specific random numbers having the configurable lengths.

16. The system of claim 15, wherein a length of the pseudo-random stream of bits is a configuration or processing parameter to the random generator.

17. The system of claim 15, wherein the multiple seed values are to be pseudo randomly selected as golden prime numbers by the random generator.

18. The system of claim 15, wherein the random generator concurrently processes inversions on one or more different seed values and combines the resulting different digits from the different inversions with the digits to generate the pseudo-random stream of bits.

19. The system of claim 15, wherein the random generator is to add varying groupings of the digits together and perform a modulus 2 operation on the results to acquire each bit of the pseudo-random stream of bits.

* * * * *

UNITED STATES PATENT AND TRADEMARK OFFICE
CERTIFICATE OF CORRECTION

| | | |
|---|---|---|
| PATENT NO. | : 8,145,691 B2 | |
| APPLICATION NO. | : 11/508719 | |
| DATED | : March 27, 2012 | |
| INVENTOR(S) | : Gosukonda Naga Venkata S. Sudhakar | |

It is certified that error appears in the above-identified patent and that said Letters Patent is hereby corrected as shown below:

IN THE CLAIMS:

In column 10, line 41, in Claim 15, delete "pseudo-ransom" and insert -- pseudo-random --, therefor.

Signed and Sealed this
Twenty-sixth Day of June, 2012

David J. Kappos
*Director of the United States Patent and Trademark Office*